United States Patent
Lindenmeier et al.

(10) Patent No.: US 6,169,888 B1
(45) Date of Patent: Jan. 2, 2001

(54) RECEIVING ANTENNA SCANNING DIVERSITY SYSTEM WITH CONTROLLABLE SWITCHING

(75) Inventors: Heinz Lindenmeier, Planegg; Jochen Hopf, Haar; Leopold Reiter, Gilching, all of (DE)

(73) Assignee: FUBA Automotive GmbH, Bad Salzdetfurth (DE)

( * ) Notice: Under 35 U.S.C. 154(b), the term of this patent shall be extended for 0 days.

(21) Appl. No.: 08/803,239

(22) Filed: Feb. 20, 1997

(30) Foreign Application Priority Data

Feb. 24, 1996 (DE) ................................ 196 07 045

(51) Int. Cl.⁷ ..................................................... H04B 1/06
(52) U.S. Cl. ........................ 455/277.2; 455/135; 455/272
(58) Field of Search ..................... 455/62, 63, 132, 455/133, 134, 135, 272, 273, 277.1, 277.2, 291, 129, 126, 127; 343/700 R, 702, 703, 700 MS

(56) References Cited

U.S. PATENT DOCUMENTS

| | | | |
|---|---|---|---|
| 4,876,743 | * 10/1989 | Lindenmeier et al. | 455/135 |
| 5,339,452 | * 8/1994 | Sugawara | 455/277.2 |
| 5,548,836 | * 8/1996 | Taromaru | 455/272 |
| 5,561,673 | * 10/1996 | Takai et al. | 455/277.2 |

\* cited by examiner

*Primary Examiner*—Reinhard J. Eisenzopf
*Assistant Examiner*—Sam Bhattacharya
(74) *Attorney, Agent, or Firm*—Collard & Roe, P.C.

(57) ABSTRACT

A receiving antenna system for vehicles that eliminates interference in receiving signals. The interference detector is disposed within the receiver and generates and transmits an indicating signal, or a signal derived therefrom. Such signal can be formed in several different ways, and in the site of the antenna installation, it can be converted into a switching signal that only effects the switching condition in the antenna installation having a controllable switching circuit.

20 Claims, 5 Drawing Sheets

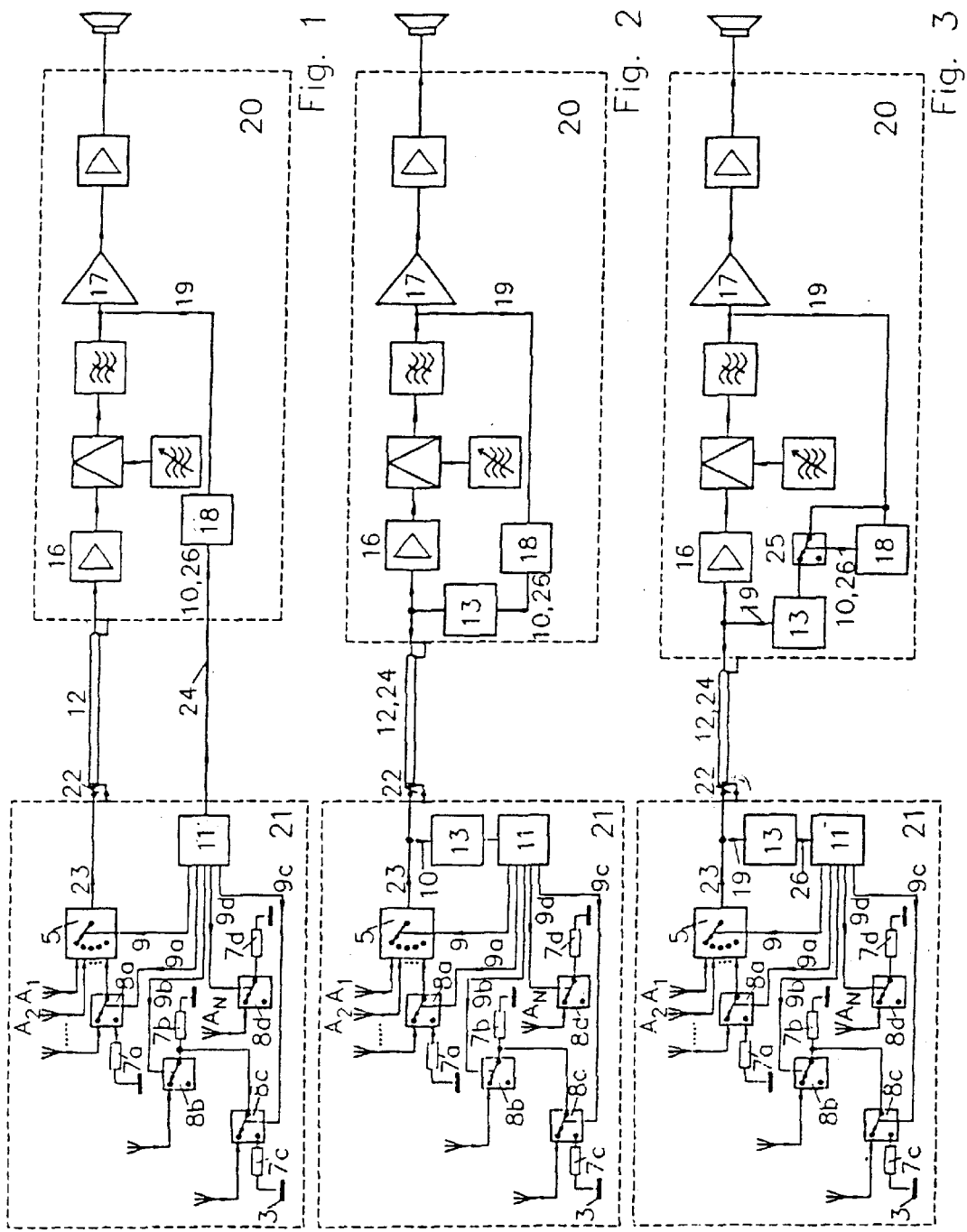

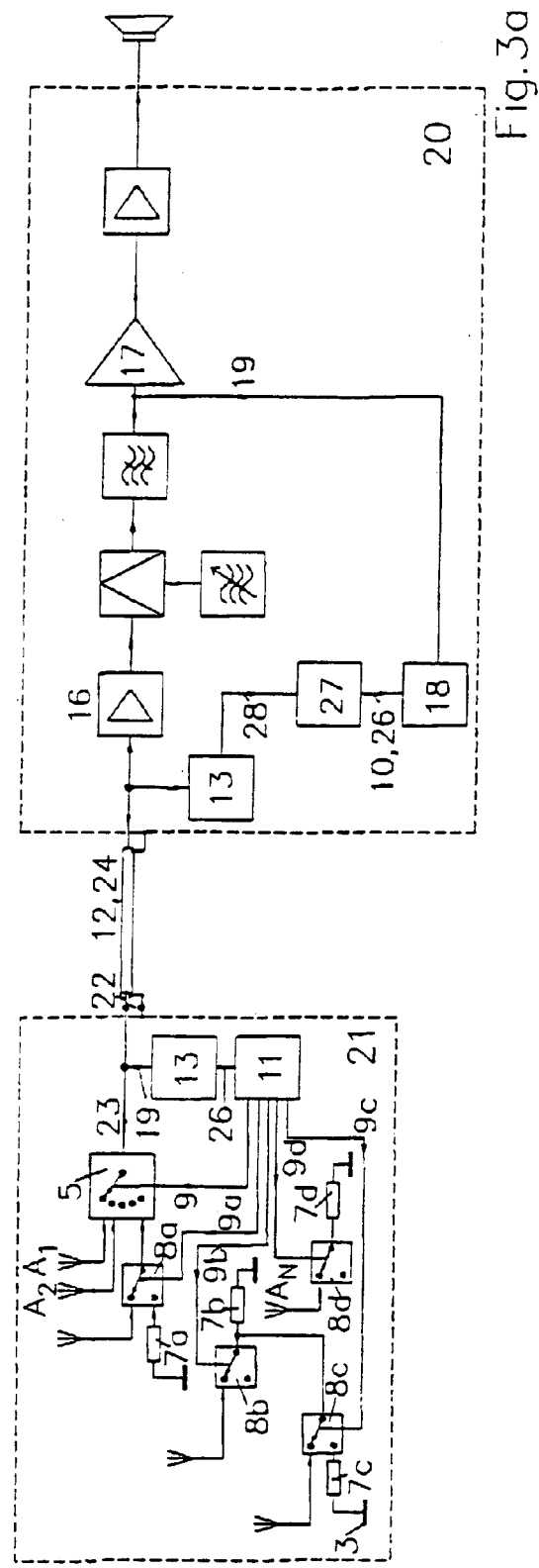

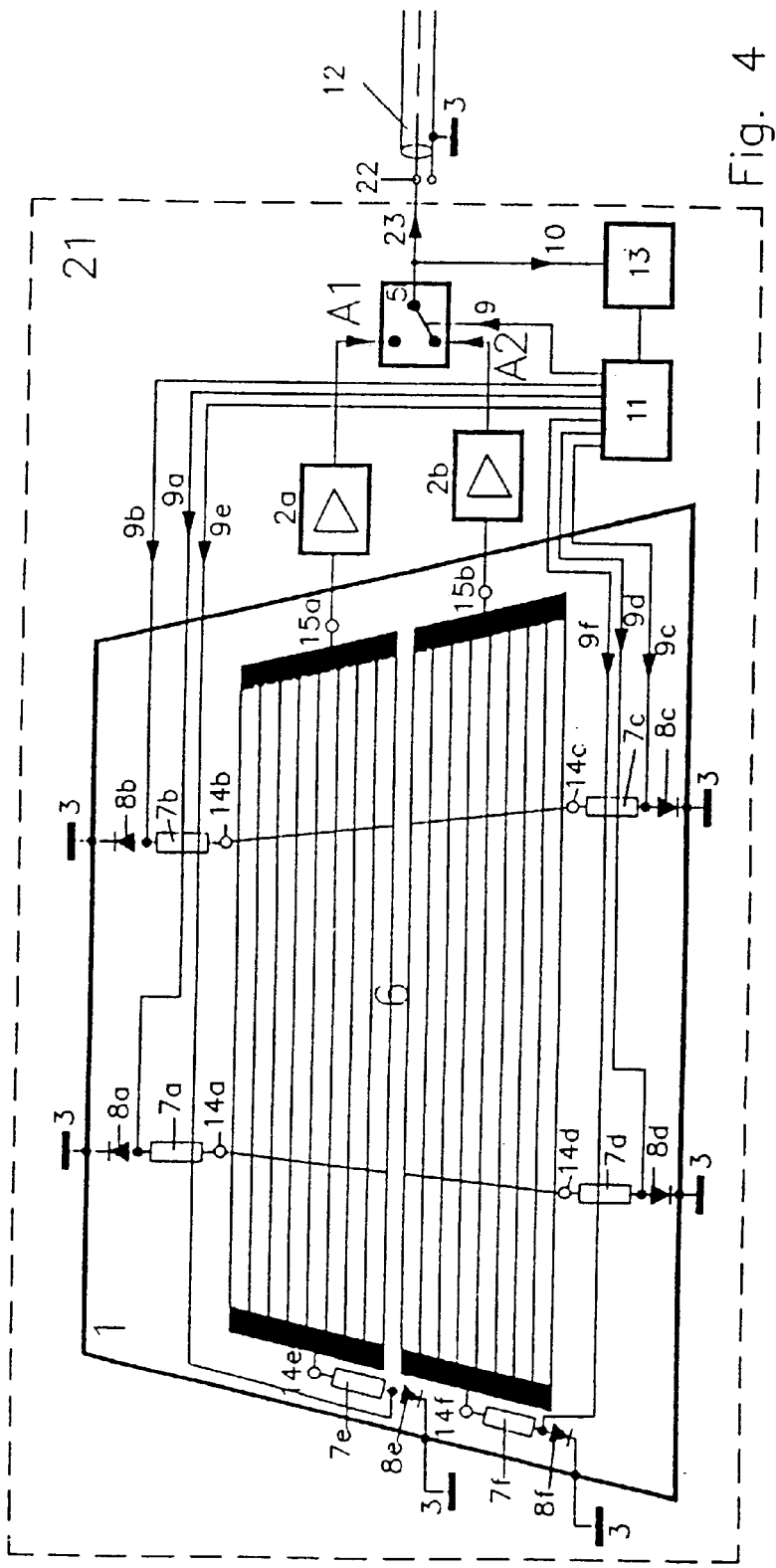

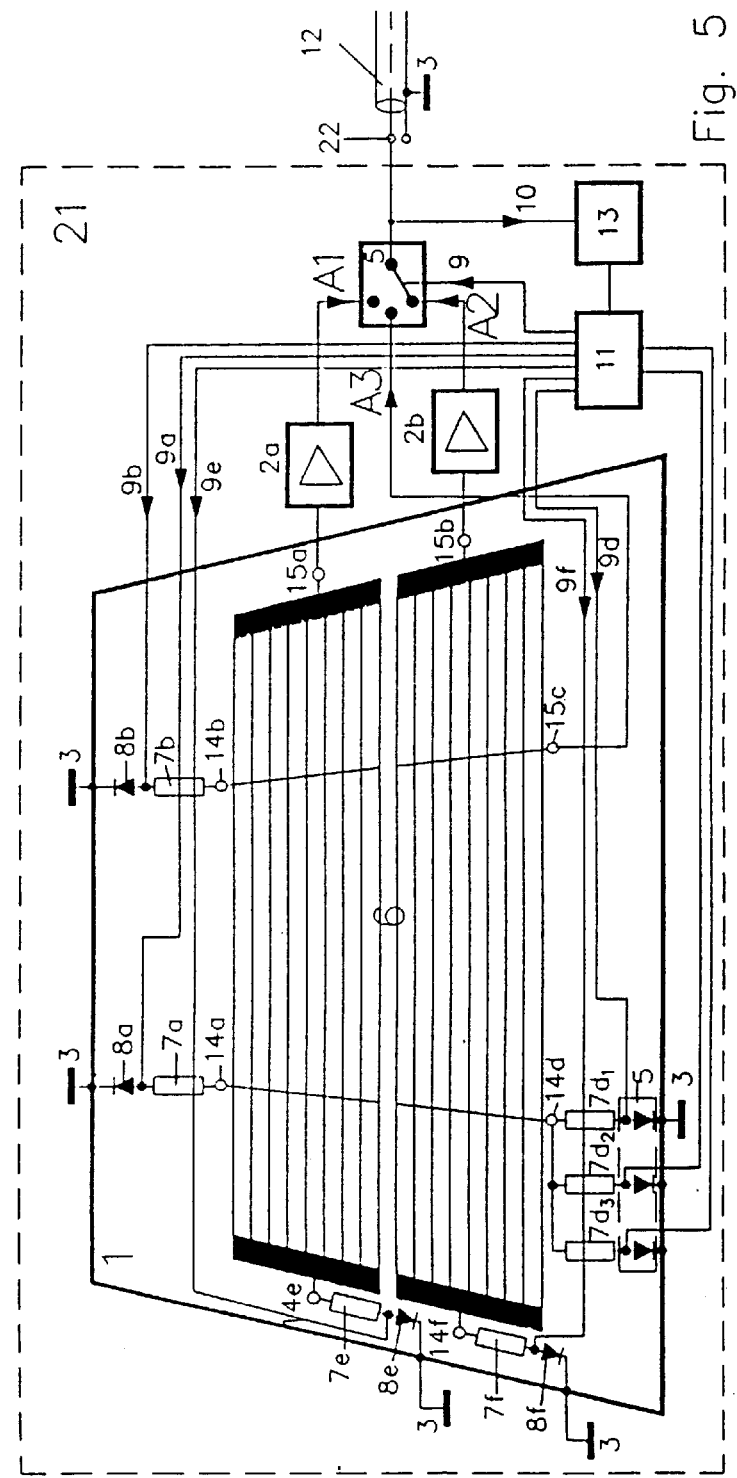

RECEIVING ANTENNA SCANNING DIVERSITY SYSTEM WITH CONTROLLABLE SWITCHING

BACKGROUND OF THE INVENTION

1. Field of the Invention

The present invention relates to antenna systems for motor vehicles. More particularly, it relates to a receiving antenna scanning diversity installation that detects and eliminates receiving interferences.

2. The Prior Art

In the scanning diversity antenna installation described in "Funkschau" (Radio Review) 8/1989 "Radio Reception From the Rear Windowpane", the received signals of four ultra-short wave antennas formed by conductors printed on the rear windowpane of a vehicle are selected by a diversity processor. The diversity processor is mounted within the immediate proximity of the antenna installation, and has an output that is coupled to the antenna connection point. An antenna line connects the receiver to the antenna connection point. For detecting interference in high-frequency signals, the intermediate frequency signal present in the receiver is supplied to the diversity processor for distortion detection. The detector detects interferences with the received signal, and generates a signal that shifts the antenna selector switch to another switching position. The processor cyclically switches the antenna signals through to the receiver until a signal with sufficiently low interference has been found. The selection of the antenna signals is connected with change-over processes that lead to more or less audible interferences depending on the receiver.

One drawback with an arrangement of this type is that the interference detector is disposed at the site of the antenna installation.

The diversity processor operating according to the state of the art does not readily permit coordinated measures for mute-switching in the receiver. Another problem is the technical expenditure required for the introduction of an additional connection line between the diversity processor and the receiver. The additional line is needed when the change-over process pulses are supplied to the receiver during the change-over process for briefly switching the receiver mute. DE 44030612 describes a system by which change-over interferences can be avoided, however, such measures are very costly to implement.

SUMMARY OF THE INVENTION

The present invention provides a receiving antenna scanning diversity system that offers a greater number of antenna signals to the receiver for enhancing reception, while at the same time keeping the change-over interferences as low as possible.

According to the invention, the interference detector is incorporated into the receiver. This makes it possible to apply measures for suppressing audible noises associated with the change-over process, such as, for example, by switching the low-frequency amplifier mute during the change-over process. Overall, this permits superior tuning between the antenna installation and the receiver. Antenna diversity installations of the described type are expected to function together with different receivers. Generally, as a trade rule, the vehicle manufacturer specifies the antenna installation without making provision for any defined type of receiver that is optimized for such installation.

By incorporating the interference detector into the receiver, the present invention offers the receiver manufacturers the possibility to directly use an internally generated signal for indicating interference when a receiving interference occurs, without time delay. For example, to make the change-over process inaudible by switching to mute, or by soft mute-switching. It has been found, in practical application, that efficient suppression of change-over noise can be achieved only if the interference detection and the mute-switching measures are carefully harmonized with each other. The signal transmitted from the receiver to the antenna installation is, therefore, extremely simple and limited to logic signals. The logic signals can be interpreted simply on the side of the antenna installation, and will initiate a change-over process that will not generate any noticeable interferences.

Therefore, according to the present invention, when an interference is detected in the received signal, the receiver transmits to the antenna installation an indicating signal, or a signal derived therefrom. Such signal can be formed in several different ways, and in the site of the antenna installation, it can be converted into a switching signal that only effects the switching condition in the antenna installation having a controllable switching circuit. The change-over times are very short due to the availability of rapidly working electronic switches, and as such, further adaptation of the antenna installation with controllable switching circuit to any receiver specifically intended for such an installation, is not required.

It is therefore an object of the present invention to provide a receiving antenna scanning diversity system that offers a greater number of antenna signals to the receiver.

It is another object of the invention to provide a receiving antenna scanning diversity system that provides enhanced reception while keeping change-over interferences as low as possible.

It is a further object of the invention to provide a receiving antenna scanning diversity system that requires only one connection line between the antenna installation and the receiver.

Another object of the invention is to provide a receiving antenna scanning diversity system for vehicles that operates efficiently and reliably.

BRIEF DESCRIPTION OF THE DRAWINGS

Other objects and features of the present invention will become apparent from the following detailed description considered in connection with the accompanying drawings which disclose an embodiment of the present invention. It should be understood, however, that the drawings are designed for the purpose of illustration only and not as a definition of the limits of the invention.

In the drawings, wherein similar reference characters denote similar elements throughout the several views:

FIG. 1 is a schematic diagram of a first embodiment of the receiving-antenna scanning diversity system according to the invention;

FIG. 2 is a schematic diagram of a second embodiment of the receiving-antenna scanning diversity system according to the invention;

FIG. 3 is a schematic diagram of a third embodiment of the receiving-antenna scanning diversity system according to the invention;

FIG. 3a is a schematic diagram of an additional embodiment wherein a signal generator forms a signal bust for use as an indicating signal;

FIG. 4 is a schematic representation of the system according to a further embodiment of the invention;

FIG. 5 is a schematic representation of the receiving antenna system according to another embodiment of the invention.

DETAILED DESCRIPTION OF PREFERRED EMBODIMENTS

Figure 6:
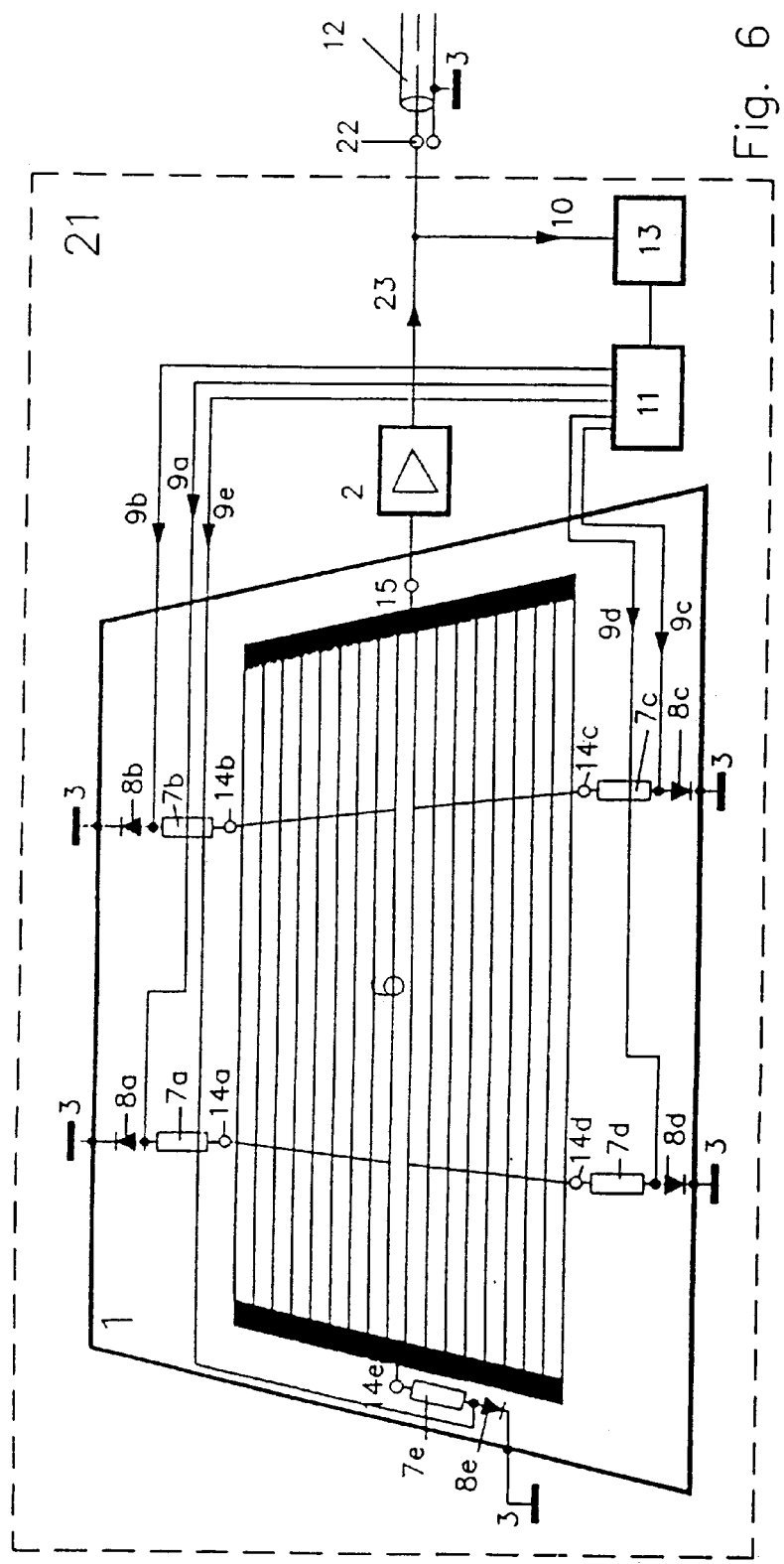
FIG. 6 is a schematic representation of the receiving antenna system according to another embodiment of the invention.

Turning now in detail to the drawings, FIG. 1 shows an antenna installation 21 with controllable switching circuit, and receiver 20 with an antenna line 12 connecting the receiver to antenna installation 21. A separate signal line 24 is provided between receiver 20 and antenna installation 21 for transmitting an indicating signal 10, or the control signals 26 derived therefrom, from receiver 20 to antenna installation 21.

In the receiving antenna scanning diversity system according to FIG. 1, the occurrence of an interference is detected through the use of an indicating signal 10, sent via signal line 24, to antenna installation 21 having a controllable switching circuit (11, 5, 8) defined by switching circuit 11, selector switches 5, change-over switches 8, control signals 9, and in additional embodiments, selector circuits 13. It is advantageous that only one additional line is required in connection with a large selection of antenna signals (i.e., signal line 24). Signal line 24 can be any suitable known type of conductor for transmitting logic signals, such as, for example, fiber optic conductors.

If, in relation to the geometric dimensions of the antenna installation 21, the antennas $A_1$, $A_2$, $A_3$... $A_n$ are far removed from receiver 20, it is preferable to avoid using several lines to connect antenna installation 21 with receiver 20. This is particularly important, for example, with motor vehicles where a multi-antenna system is applied to their rear windowpane. In this case, only one antenna line 12, carrying a receiving signal 23, is required to connect antenna installation 21 with receiver 20 in the front part of the vehicle. Additional antenna lines would incur additional costs for suitable high-frequency plug connections. Furthermore, such plug connection represent additional error sources of the system, and thereby reduces operational safety.

In a simple case , indicating signal 10 can be designed as a signal 26 that is binary in configuration and which indicates the occurrence of the interference as long as the binary signal is present. In order to cause a particularly quick switching reaction in the controllable switching circuit (11, 5, 8) it is possible to make signal 26 a pulse signal from the response side of detector 18 by differentiation of indicating signal 10. By forming a suitable pulse whose spectral energy, either does not form any contribution in the frequency range of the received signals, or whose duration in time is so short that it is physiologically not noticed, it is possible to transmit such pulse via antenna line 12 to antenna installation 21 with controllable switching circuit (11, 5, 8) without causing interference with the reception.

FIG. 3 shows antenna installation 21 having intermediate frequency signal 19, which in the case of interference, is keyed up as a signal burst that is selectively transmitted via antenna line 12, and by way of intermediate-frequency filters.

If the indicating signal is to be transmitted to the antenna installation 21 of the invention, for example, via a line carrying pre-applied DC voltage, or via another signal line 24, it is possible, according to a further embodiment of the invention, to transmit such signal 26 as the envelope curve of a signal burst of high frequency, and to recover said envelope curve in the antenna installation 21 in order to trigger the change-over action.

The high-frequency oscillation for forming the burst can be formed by the intermediate-frequency signal 19 of receiver 20 itself. For obtaining such oscillation, signal 19 is supplied not only to interference detector 18, but transmitted from receiver 20 to the antenna installation 21 also by way of an electronic switch 25 and signal line 24 (FIG. 3).

FIG. 3a shows an additional embodiment of the invention where a high frequency signal generator (27) is connected to interference detector 18 and produces a signal burst (28) of high frequency through analysis of said indicating signal (10) or control signal (26) derived therefrom.

In a particularly advantageous embodiment of the invention, which can be produced at a favorable cost, the high frequency antenna line 12 can be used at the same time as signal line 24. In this case, it is necessary to protect the receiver input against indicating signal 10, and against any interferences that may be caused by such signal. This is accomplished frequency-selectively using selection circuits 13, which, on the receiver side, serve for coupling in the indicating signal 10, and on the side of the antenna installation 21 for coupling out said signal. In the case of the transmission of signal 26 as a signal burst of intermediate-frequency for indicating interference, it is possible, and highly advantageous, to use standard intermediate-frequency filters for selection circuits 13.

In the antenna installation 21, signal 26 is filtered out of the receiving signal 23 and supplied to switching circuit 11 with the help of selection circuits 13. The control signals 9 are generated on the output of switching circuit 11 and change the conditions of selector switches 5 and of the change-over switches 8 in the antenna installation 21, whereby another receiving signal 23 is transmitted to the receiver 20. The advantage of this arrangement lies in the free creatability by special programming of switching circuit 11, permitting a defined cycle for forming the receiving signals supplied to the receiver. In the simplest form, the various switching positions of change-over switches 8 are cyclicly and repeatedly adjusted in a preset configuration.

FIGS. 4 to 6 show practical embodiments of the invention on examples of antenna installation 21 with controllable switching circuit (11, 5, 8, 13), which are substantially formed by the heating field 6 in windowpane 1 of a vehicle. In FIGS. 4 and 5, different antenna part connections 14 and 15 are produced by connections to the heating field, whereby the amplifiers 2a and 2b are connected to the two antenna part connections 15a and 15b, respectively, for forming active antennas. The outputs of amplifiers 2a and 2b are connected to antenna selection switch 5, by which one of the amplifier outputs is switched through to the antenna connection point 22. The electronically controllable selector switch 5 is controlled by the switching circuit 11 via control signal 9 for the further formation of different receiving signals at the antenna connection site 22.

FIG. 5 shows a modified version of the circuit of FIG. 4 where the electronically controllable selector 5 replaces the change-over switches in order to switch to different impedances $7d_1$, $7d_2$ and $7d_3$ to the antenna part connection 14d. Electronically controllable selector 5 is grounded at a grounding point 3. The different impedances $7d_1$, $7d_2$, $7d_3$, etc. are preferably provided as reactances.

FIG. 6 shows an additional embodiment of the invention having at least one amplifier (2) with an input which is selectively coupled to second antenna part connection (15) thereby forming active antennas, and an output connected to antenna connection site (22). There are no selector switches (5) as in prior embodiments and antenna connections (14) are loaded with different impedances (7) via change over switches (8).

While several embodiments of the present invention have been shown and described, it is to be understood that many changes and modifications may be made there unto without departing from the spirit and scope of the invention as defined in the appended claims.

What is claimed is:

1. A receiving antenna scanning diversity system with a controllable switching circuit for vehicles operating in the meter wave range with an antenna installation (21) and a receiver (20) connected to the antenna installation via an antenna line (12) and antenna connection site (22), the antenna installation (21) having reception properties and including a plurality of individual antenna parts ($A_1, A_2, \ldots A_n$), the system comprising:

an interference detector (18) disposed within the receiver (20) and adapted to detect interference in a receiving signal (23) and an intermediate frequency signal (19), said detector generating an indicating signal (10) upon detection of interference;

a switching circuit (11) disposed within the antenna installation (21) and having a plurality of controllable selector switches (5) and a plurality of change-over switches (8), said switching circuit (11) changing the reception properties of the antenna installation (21) by switching the position of at least one of said selector (5) and change-over switches (8), the switching position of at least one of said switches (5, 8) changing the receiving signal (23) present in the antenna connection site (22), the switching position being repeated until said indicating signal (10) indicates no interference;

a signal line (24) coupled between the receiver (20) and the antenna installation (21) and adapted to transmit said indicating signal (10) to said switching circuit (11);

said switching circuit (11) receiving said indicating signal (10) via said signal line (24) and operating in conjunction with said interference detector (18) to change the switching position of said selector and change-over switches (5, 8) based on reception interference detected in the received signal (23) and the intermediate-frequency signal (19);

a high frequency generator (27) disposed within the receiver (20) and coupled to said interference detector (18), said generator forming a signal burst (28) of high frequency through analysis of said indicating signal (10) or a control signal (26) derived therefrom; and an electronic switch (25) disposed within the receiver (20) and coupled to said high frequency generator (27), said indicating signal (10) switching the intermediate frequency signal (19) through to signal line (24) via said electronic switch (25), and wherein said signal burst (28) includes a high-frequency oscillation formed by the intermediate-frequency signal (19).

2. A receiving antenna scanning diversity system with a controllable switching circuit for vehicles operating in the meter wave range with an antenna installation (21) and a receiver (20) connected to the antenna installation via an antenna line (12) and antenna connection site (22), the antenna installation (21) having reception properties and including a plurality of individual antenna parts ($A_1, A_2, \ldots A_n$), the system comprising:

an interference detector (18) disposed within the receiver (20) and adapted to detect interference in a receiving signal (23) and an intermediate frequency signal (19), said detector generating an indicating signal (10) upon detection of interference;

a switching circuit (11) disposed within the antenna installation (21) and having a plurality of controllable selector switches (5) and a plurality of change-over switches (8), said switching circuit (11) changing the reception properties of the antenna installation (21) by switching the position of at least one of said selector (5) and change-over switches (8), the switching position of at least one of said switches (5, 8) changing the receiving signal (23) present in the antenna connection site (22), the switching position being repeated until said indicating signal (10) indicates no interference;

a signal line (24) coupled between the receiver (20) and the antenna installation (21) and adapted to transmit said indicating signal (10) to said switching circuit (11), wherein the antenna installation (21) further comprises antenna part connections (14) connected to said change-over switches (8), said antenna part connections (14) are loaded with a plurality of different impedances (7) by said change-over switches (8); and said switching circuit (11) receiving said indicating signal (10) via said signal line (24) and operating in conjunction with said interference detector (18) to change the switching position of said selector and change-over switches (5, 8) based on reception interference detected in the received signal (23) and the intermediate-frequency signal (19).

3. The receiving antenna scanning diversity system according to claim 2, further comprising a binary control signal (26) derived from said indicating signal (10) for controlling said switching circuit (11).

4. The receiving antenna scanning diversity system according to claim 2, further comprising a pulse signal derived from said indicating signal (10) through differentiation for controlling said switching circuit (11).

5. The receiving antenna scanning diversity system according to claim 2, further comprising a high frequency generator (27) disposed within the receiver (20), said generator forming a signal burst (28) of high frequency through analysis of said indicating signal (10) or control signal (26) derived therefrom.

6. The receiving antenna scanning diversity system according to claim 2, wherein said indicating signal (10) transmits switching conditions to said switching circuit (11) in the form of a DC voltage coding.

7. The receiving antenna scanning diversity system according to claim 2, further comprising control signals (9) formed at an output in said switching circuit (11), said control signals (9) adapted to adjust the position of at least one of said selector switches (5) and change-over switches (8) in response to interference indicated by said interference detector (18).

8. The receiving antenna scanning diversity system according to claim 7, wherein said control signals (9) are formed such that a cyclic repetition of switching positions of said selector switches (5) and said change over switches (8) are performed is an preset configuration.

9. The receiving antenna scanning diversity system according to claim 2, wherein said signal line (24) provides DC voltage supply to said switching circuit (11).

10. The receiving antenna scanning diversity system according to claim 2, wherein said signal line (24) is formed by a fiber-optic conductor.

11. The receiving antenna scanning diversity system according to claim 2, wherein said antenna connections (14) are loaded with different impedances (7) by said change-over switches (8).

12. The receiving antenna scanning diversity system according to claim 2, wherein said change-over switches (8) have a passage and blockage operation mode that is electronically controllable by said switching circuit (11).

13. A receiving antenna scanning diversity system with a controllable switching circuit for vehicles operating in the meter wave range with an antenna installation (21) and a receiver (20) connected to the antenna installation via an antenna line (12) and antenna connection site (22), the antenna installation (21) having reception properties and including a plurality of individual antenna parts ($A_1, A_2, \ldots A_n$), the system comprising:

- an interference detector (18) disposed within the receiver (20) and adapted to detect interference in a receiving signal (23) and an intermediate frequency signal (19), said detector generating an indicating signal (10) upon detection of interference;
- a switching circuit (11) disposed within the antenna installation (21) and having a plurality of controllable selector switches (5) and a plurality of change-over switches (8), said switching circuit (11) changing the reception properties of the antenna installation (21) by switching the position of at least one of said selector (5) and change-over switches (8), the switching position of at least one of said switches (5, 8) changing the receiving signal (23) present in the antenna connection site (22), the switching position being repeated until said indicating signal (10) indicates no interference;
- a signal line (24) coupled between the receiver (20) and the antenna installation (21) and adapted to transmit said indicating signal (10) to said switching circuit (11), wherein the antenna line (12) is combined with said signal line (24), and said indicating signal (10) is transmitted superimposed on said receiving signal (23) on an output of the receiver (20) to antenna installation (21) via the combined line (12, 24); and
- said switching circuit (11) receiving said indicating signal (10) via said signal line (24) and operating in conjunction with said interference detector (18) to change the switching position of said selector and change-over switches (5, 8) based on reception interference detected in the received signal (23) and the intermediate-frequency signal (19).

14. The receiving antenna scanning diversity system according to claim 13, further comprising means for preventing said indicating signal (10) from causing interferences in receiver (20) through antenna line (12).

15. The receiving antenna scanning diversity system according to claim 14, further comprising:

- a first selection circuit (13) disposed within the antenna installation (21) and connected between the antenna line (12) and said switching circuit (11);
- a second selection circuit (13) disposed within the receiver (20) and connected between said interference detector (18) and the antenna line (12);
- said first and second selection circuits (13) being frequency selective filters for said indicating signal (10) and said control signal (26) and said signal burst (28) derived from said indicating signal (10), and whereby the antenna line (12) is not loaded by impedance from the connection of said selection circuits.

16. A receiving antenna scanning diversity system with a controllable switching circuit for vehicles operating in the meter wave range with an antenna installation (21) and a receiver (20) connected to the antenna installation via an antenna line (12) and antenna connection site (22), the antenna installation (21) having reception properties and including a plurality of individual antenna parts ($A_1, A_2, \ldots A_n$), wherein the antennas ($A_1, A_2, \ldots A_n$) are formed by a heating field (6) within the windowpane (1) of a vehicle, the system comprising:

- an interference detector (18) disposed within the receiver (20) and adapted to detect interference in a receiving signal (23) and an intermediate frequency signal (19), said detector generating an indicating signal (10) upon detection of interference;
- a switching circuit (11) disposed within the antenna installation (21) and having a plurality of controllable selector switches (5) and a plurality of change-over switches (8), said switching circuit (11) changing the reception properties of the antenna installation (21) by switching the position of at least one of said selector (5) and change-over switches (8), the switching position of at least one of said switches (5, 8) changing the receiving signal (23) present in the antenna connection site (22), the switching position being repeated until said indicating signal (10) indicates no interference;
- a signal line (24) coupled between the receiver (20) and the antenna installation (21) and adapted to transmit said indicating signal (10) to said switching circuit (11);
- a first and a second antenna part connections (14 and 15) formed by connections to the heating field (6);
- amplifiers (2) having an input selectively coupled to at least one of said second antenna part connections (15) to form active antennas, and an output connected to said selector switch (5); and
- said switching circuit (11) receiving said indicating signal (10) via said signal line (24) and operating in conjunction with said interference detector (18) to change the switching position of said selector and change-over switches (5, 8) based on reception interference detected in the received signal (23) and the intermediate-frequency signal (19).

17. The receiving antenna scanning diversity system according to claim 16, wherein said first antenna part connections (14) not coupled to said amplifiers are loaded with different impedances (7) through connection to said change-over switches (8).

18. The receiving antenna scanning diversity system according to claim 16, wherein at least one of said first antenna part connections (14) is loaded with different impedances (7) in the form of reactances via connection to said selector switch (5).

19. A receiving antenna scanning diversity system with a controllable switching circuit for vehicles operating in the meter wave range with an antenna installation (21) and a receiver (20) connected to the antenna installation via an antenna line (12) and antenna connection site (22), the antenna installation (21) having reception properties and including a plurality of individual antenna parts ($A_1, A_2, \ldots A_n$), wherein the antennas ($A_1, A_2, \ldots A_n$) are formed by a heating field (6) within the windowpane (1) of a vehicle, the system comprising:

- an interference detector (18) disposed within the receiver (20) and adapted to detect interference in a receiving signal (23) and an intermediate frequency signal (19), said detector generating an indicating signal (10) upon detection of interference;
- a switching circuit (11) disposed within the antenna installation (21) and having a plurality of change-over switches (8), said switching circuit (11) changing the reception properties of the antenna installation (21) by switching the position of at least one of change-over switches (8), the switching position of at least one of said switches (8) changing the receiving signal (23) present in the antenna connection site (22), the switching position being repeated until said indicating signal (10) indicates no interference;

a signal line (24) coupled between the receiver (20) and the antenna installation (21) and adapted to transmit said indicating signal (10) to said switching circuit (11);

a first and a second antenna part connections (14 and 15) formed by connections to the heating field (6);

at least one amplifier (2) having an input selectively coupled to said second antenna part connection (15) to form active antennas, and an output connected to said antenna connection site (22); and said switching circuit (11) receiving said indicating signal (10) via said signal line (24) and operating in conjunction with said interference detector (18) to change the switching position of said change-over switches (8) based on reception interference detected in the received signal (23) and the intermediate-frequency signal (19).

20. A receiving antenna scanning diversity system with a controllable switching circuit for vehicles operating in the meter wave range with an antenna installation (21) and a receiver (20) connected to the antenna installation via an antenna line (12) and antenna connection site (22), the antenna installation (21) having reception properties and including a plurality of individual antenna parts ($A_1, A_2, \ldots A_n$), the system comprising:

an interference detector (18) disposed within the receiver (20) and adapted to detect interference in a receiving signal (23) and an intermediate frequency signal (19), said detector generating an indicating signal (10) upon detection of interference;

a switching circuit (11) disposed within the antenna installation (21) and having a plurality of controllable selector switches (5) said switching circuit (11) changing the reception properties of the antenna installation (21) by switching the position of at least one of said selector switches(5), the switching position of at least one of said switches (5) changing the receiving signal (23) present in the antenna connection site (22), the switching position being repeated until said indicating signal (10) indicates no interference;

a signal line (24) coupled between the receiver (20) and the antenna installation (21) and adapted to transmit said indicating signal (10) to said switching circuit (11), wherein the antenna line (12) is combined with said signal line (24), and said indicating signal (10) is transmitted superimposed on said receiving signal (23) on an output of the receiver (20) to antenna installation (21) via the combined line (12, 24); and said switching circuit (11) receiving said indicating signal (10) via said signal line (24) and operating in conjunction with said interference detector (18) to change the switching position of said selector switches (5) based on reception interference detected in the received signal (23) and the intermediate-frequency signal (19).

* * * * *